(12) United States Patent
Hamaji

(10) Patent No.: US 6,337,680 B1
(45) Date of Patent: Jan. 8, 2002

(54) ROLLING/SLIDING TYPE POINTING DEVICE

(76) Inventor: Shinsuke Hamaji, Cosmos Heights Dougo 407, Iwaidani-Higashimachi 441, Matsuyama-shi, Ehime-ken (JP)

( * ) Notice: Subject to any disclaimer, the term of this patent is extended or adjusted under 35 U.S.C. 154(b) by 0 days.

(21) Appl. No.: 09/376,535

(22) Filed: Aug. 18, 1999

(30) Foreign Application Priority Data

Aug. 21, 1998 (JP) ............................................. 10-274230
Jun. 29, 1999 (JP) ............................................. 11-182639

(51) Int. Cl.⁷ .................................................. G09G 5/08
(52) U.S. Cl. ........................................ 345/157; 345/184
(58) Field of Search ................................ 345/156, 184, 345/151, 163–166, 168, 158; 74/471 XY; 341/20, 22, 35; 273/148 B; 400/472, 473

(56) References Cited

U.S. PATENT DOCUMENTS

| 4,896,554 A | * | 1/1990 | Culver ......................... 345/184 |
| 5,115,231 A | * | 5/1992 | Avila et al. .................. 345/184 |
| 5,164,712 A | * | 11/1992 | Niitsuma ...................... 345/184 |
| 5,235,868 A | * | 8/1993 | Culver ......................... 345/183 |
| 5,270,690 A | * | 12/1993 | Oberg .......................... 345/163 |
| 5,479,192 A | * | 12/1995 | Carroll, Jr. et al. ......... 345/168 |
| 5,635,926 A | * | 6/1997 | Li ............................. 74/471 XY |
| 5,883,718 A | * | 3/1999 | Shu-ming ..................... 345/184 |
| 6,075,518 A | * | 6/2000 | Pruchniak ..................... 345/157 |

FOREIGN PATENT DOCUMENTS

| JP | 9061/91 | 3/1991 |
| JP | 9062/91 | 3/1991 |
| JP | 9063/91 | 3/1991 |

* cited by examiner

Primary Examiner—Regina Liang
(74) Attorney, Agent, or Firm—Griffin & Szipl, P.C.

(57) ABSTRACT

In one of the illustrative embodiments of the invention disclosed, a hollow roller (21) is rotatably and axially slidably carried on a rail (22) connected with a casing. In the other of the embodiments, a roller (31) is rotatably and axially slidably received in a recessed fitting (32). In either case, the pointing device of this invention is provided with noncontact means (23, 27; 33) such as photoelectric means for detecting the direction in, and the distance by, which the roller is axially moved and for detecting the direction in which the roller is rotated and the number of revolutions thereof.

19 Claims, 5 Drawing Sheets

ROLLING/SLIDING TYPE POINTING DEVICE

BACKGROUND OF THE INVENTION

This invention relates to a device to be used to input data to a computer, and more particularly to a pointing device to be used to control the movement of a cursor on a display screen. In particular the invention concerns itself with a rolling/sliding type pointing device in which a sliding cylinder is used for moving the cursor.

DESCRIPTION OF THE PRIOR ART

When data on a desired two-dimensional position are to be provided to a computer, it has been conventional practice in the past to use various pointing devices such as a mouse or trackball so as to dispose the cursor in overlying relationship with respect to a specific position on the display screen.

The mouse has come into wide use because, in order to input the aforesaid data to the computer, the mouse is simple to use such that it has only to be moved on the top of a desk. Two types of mice are known, one of which is a mechanical mouse having a ball on its underside that can roll in all directions. Rollers within the mouse ride on the ball so as to be contra-rotated thereon so that the direction the ball is rolling and the number of revolutions thereof may be detected and provided to the computer as the direction in which the mouse is moving and the distance by which the mouse moves. Another type is an optical mouse, which requires a special mousepad that has a grid drawn thereon. This mousepad is irradiated by a laser to detect the mouse's movement. The aforesaid direction and distance to be provided to the computer are found from the pattern of light beams reflected from the mousepad.

Essentially, the trackball is a mouse lying on its back, with a portion of the rotatably mounted ball exposed above the upper surface of the body. To move the cursor, the ball is rotated with a thumb, fingers, or the palm of a hand.

The mouse has the disadvantage that it requires much space to use it on the top of the desk and gives rise to an operational difficulty with limited space at an operator's disposal. The trackball has the disadvantage that it makes it difficult to quickly input positional information by rectilinearly moving the cursor.

Input devices designed to eliminate both of the aforesaid disadvantages are disclosed in Japanese Utility Model Examined Publications Nos. 3-9061 to 3-9063. An important feature of these input devices is that a shaft is rotatably supported by the casing of a keyboard and extends through a cylinder such that the shaft allows the cylinder to be slidable thereon but renders the same non-rotatable relative to said shaft. Detectors are arranged to detect, respectively, the distance by which the cylinder is axially moved and the number of revolutions thereof. A position on the display screen is represented by X and Y, where X is determined by the distance by which the cylinder is axially moved and Y is determined by the number of revolutions of the cylinder.

Basically, any of the aforesaid input devices is constructed as shown in FIG. 8. A shaft 11 is journaled in suitable bearings 10 in the casing 9 of a keyboard. As will be apparent from FIG. 9, the shaft 11 has a middle portion 11a of oval shape in cross section, which extends through a cylinder 12 such that the middle portion 11a allows the cylinder to be slidable thereon. Consequently, the cylinder 12 can be moved in its axial direction as indicated by an arrow B along the middle portion 11a of the shaft 11 on one hand, and can be rotated about the axis of the shaft 11 as indicated by an arrow C in FIG. 9 on the other hand. First and second rotatable wheels 13 and 14 connected respectively with first and second encoders 15 and 16 abut against the cylindrical surface of the cylinder 12 such that the axes of these rotatable wheels intersect orthogonally and the axis of the second rotatable wheel 14 is disposed in parallel relation with the axis of the shaft 11. Consequently, the first rotatable wheel 13 is rotated when the cylinder 12 is subjected to a rectilineal motion in the direction of the arrow B, while the second rotatable wheel 14 is rotated when the cylinder 12 is subjected to a rotary motion in the direction of the arrow C.

The aforesaid input devices have a disadvantage that the cylinder 12 cannot provide a sufficient and constant slip in contact with the shaft 11. A cylinder 12 enlarged for the purpose of having a wide dynamic range affects the desired slip property adversely. On the other hand, a cylinder 12 which is of comparatively small diameter causes an operator to have a sense of uneasiness in rotating it, because it has to be rotated together with the shaft 11. In addition, force to be exerted on a cylinder 12 by the operator's thumb and fingers when the cylinder 12 is to be moved in its axial direction is different in magnitude from force to be exerted when the cylinder 12 is to be rotated about the axis of the shaft 11. An operational difficulty caused thereby makes it difficult to control the movement of the pointer. The aforesaid input devices have another disadvantage that they are rather complicated to manufacture, because contact type means are used for detecting the distance by which the cylinder 12 is axially moved and the number of revolutions thereof.

SUMMARY OF THE INVENTION

One of the primary objects of the invention is to provide an improved input device which incorporates the advantageous features of prior art devices without suffering from their disadvantages. The improved input device takes the form of a rolling/sliding type pointing device which does not require much space to use it, eliminates difficulties encountered in case of the trackball in rectilinearly moving the cursor, substantially facilitates the control over the movement of the cursor with a thumb and/or fingers, affords a wide dynamic range, and may be either incorporated in or separated from the keyboard.

Another object of the invention is to provide a rolling/sliding type pointing device incorporating a roller which, when detached from a recessed fitting provided for receiving the same, can be used as a stylus for input.

The first of the foregoing objects is attained by means of a rail connected with a casing, a hollow roller rotatably and axially slidably carried on the rail, and noncontact means such as photoelectric means for detecting the direction in, and the distance by, which the hollow roller is axially moved and for detecting the direction in which the hollow roller is rotated and the number of revolutions thereof.

The first of the foregoing objects is attained also in a way different from the above, i.e., by means of a recessed fitting connected with a casing, a roller rotatably and axially slidably received in the recessed fitting, and noncontact means such as photoelectric means for detecting the direction in, and the distance by, which the roller is axially moved and for detecting the direction in which the roller is rotated and the number of revolutions thereof.

The aforesaid rail or recessed fitting takes the place of the shaft used in the prior art devices, and has excellent slip properties both when allowing the roller to be axially moved and when allowing it to be rotated. The provison of non-contact means such as photoelectric means for detecting the direction in, and the distance by, which the roller is axially moved and for detecting the direction in which the roller is rotated and the number of revolutions thereof results in rendering the detecting means free from friction and permitting a compact arrangement requiring less space. The two-dimensional position of the cursor on the display screen is determined by the distance by which the roller is axially moved and by the number of revolutions of the roller.

The invention is herein described with reference to the drawings which schematically illustrate preferred embodiments of the invention.

DESCRIPTION OF THE PREFERRED EMBODIMENTS

Figure 1:
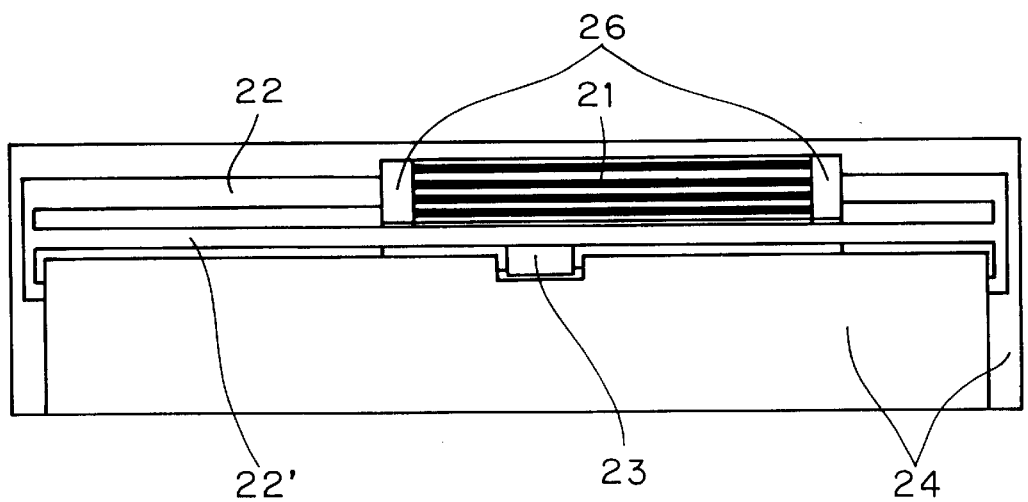
FIG. 1 is a top plan view of one embodiment of the invention.
Figure 2:
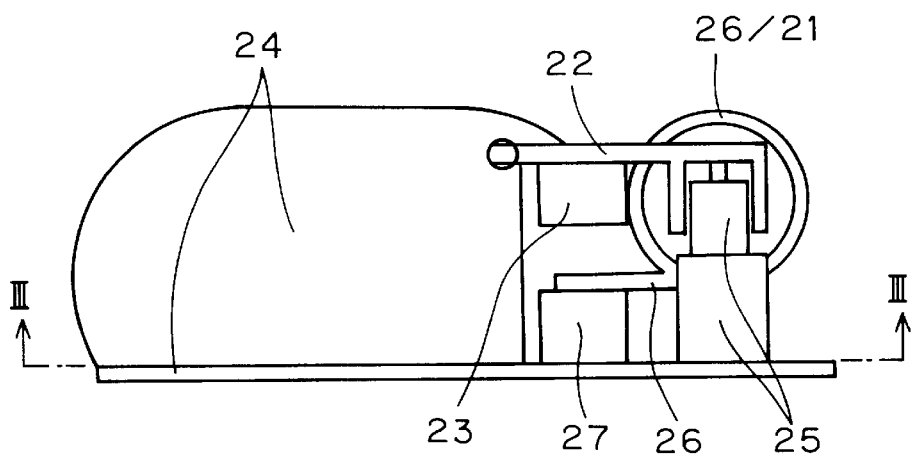
FIG. 2 is a side view thereof.
Figure 3:
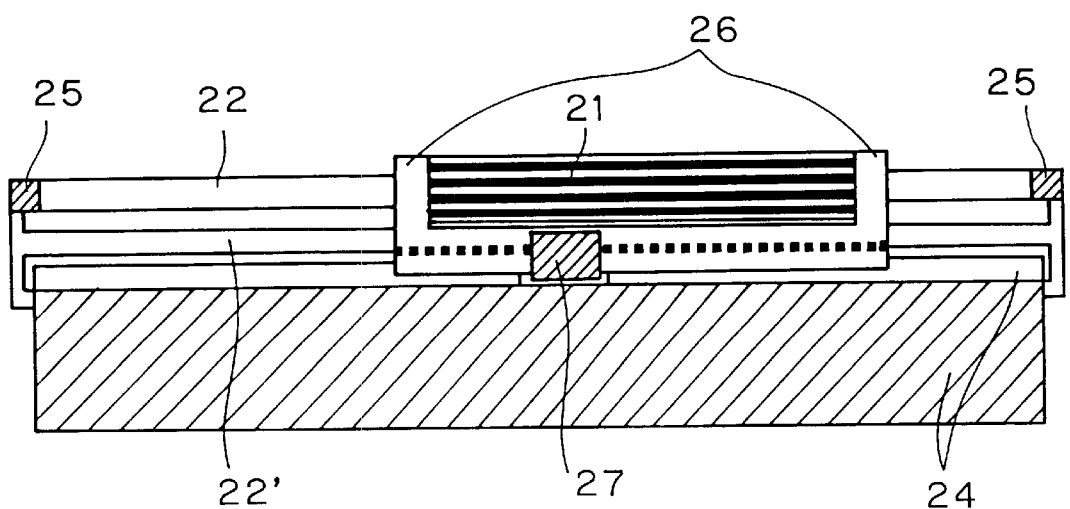
FIG. 3 is a sectional view taken on the line III—III of FIG. 2 and a perspective of the slider therein.
Figure 3:
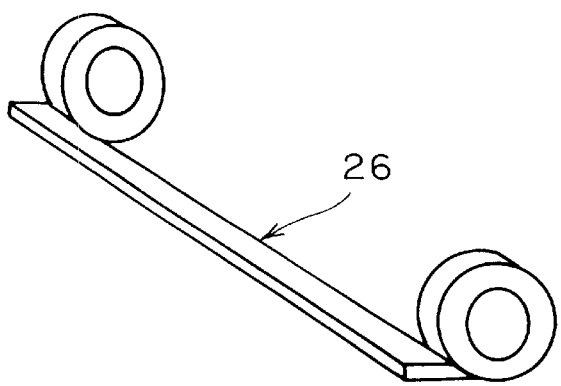

Referring now to FIGS. 1 to 3, a rolling/sliding type pointing device embodying this invention includes a hollow roller 21, which preferably has a length of 10 to 20 cm and an outer diameter of 10 to 20 mm. The hollow roller 21 is rotatably and axially slidably carried on a rail 22 which extends therethrough. An extension extends from each end of, and perpendicularly to, the rail 22 and is pivotally joined to a palmrest 24. Switch means 25 are disposed one at each end of the rail 22 on the underside thereof so that a click signal may be transmitted to a computer when the thumb or fingers of an operator engage the hollow roller 21 or the rail 22 with a force thereto.

Instead of being pivotally joined to the palmrest 24, the rail 22 may be journaled in suitable bearings yieldingly maintained in floating position by springs.

The outer cylindrical surface of the hollow roller 21 is striped along generatrices so that the stripes may serve for detecting the direction in which the hollow roller 21 is rotated and the number of revolutions thereof. Such detection is carried out by a revolution detector 23 disposed approximately medially of the ends of an auxiliary rail 22' and in opposed relationship to the outer cylindrical surface of the hollow roller 21. The revolution detector 23 is a noncontact detector well known to those skilled in the art as a detector utilized in connection with an optical mouse, which requires a special mousepad that has a grid drawn thereon.

A slider 26 of U-shaped construction terminates in a pair of ends which hold the hollow roller 21 therebetween such that these ends are respectively disposed in opposed relationship to the end faces of the hollow roller 21. Consequently, the slider 26 does not rotate together with the hollow roller 21 but is capable of axially moving together therewith. The structural details of a sliding motion detector 27 for detecting the direction in, and the distance by, which the hollow roller 21 is axially moved need not be identical with the structural details of the revolution detector 23. Signals generated by the revolution detector 23, sliding motion detector 27 and switch means 25 are provided to the computer through a control circuit (not shown).

Figure 4:
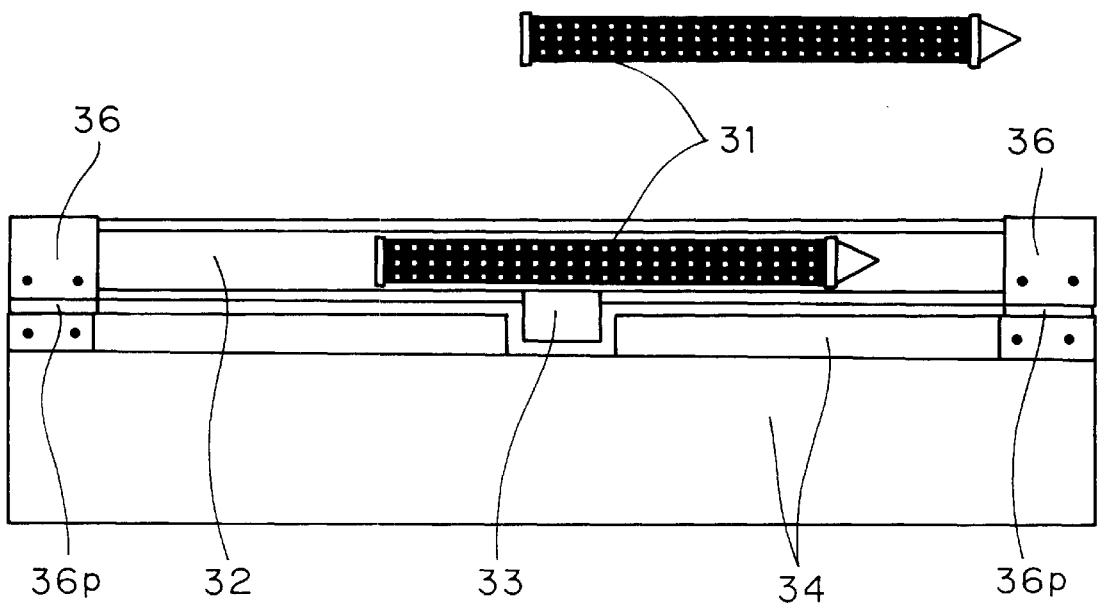
FIG. 4 is a top plan view of another embodiment of the invention.

If the outer cylindrical surface of the hollow roller 21 has a grid drawn thereon as is the case with a roller 31 shown in FIG. 4, such a hollow roller 21 has the advantage of requiring only one photoelectric detector both for detecting the direction in which the hollow roller 21 is rotated and the number of revolutions thereof and for detecting the direction in, and the distance by, which the hollow roller 21 is axially moved. Alternatively, the inner cylindrical surface of the hollow roller 21 may be circumferentially striped and the sliding motion detector 27 may be disposed within the cavity of the hollow roller 21. In brief, according to the positions occupied by the detectors, either the inner or the outer cylindrical surface of the hollow roller 21 may have either a grid or stripes drawn thereon.

Figure 6:
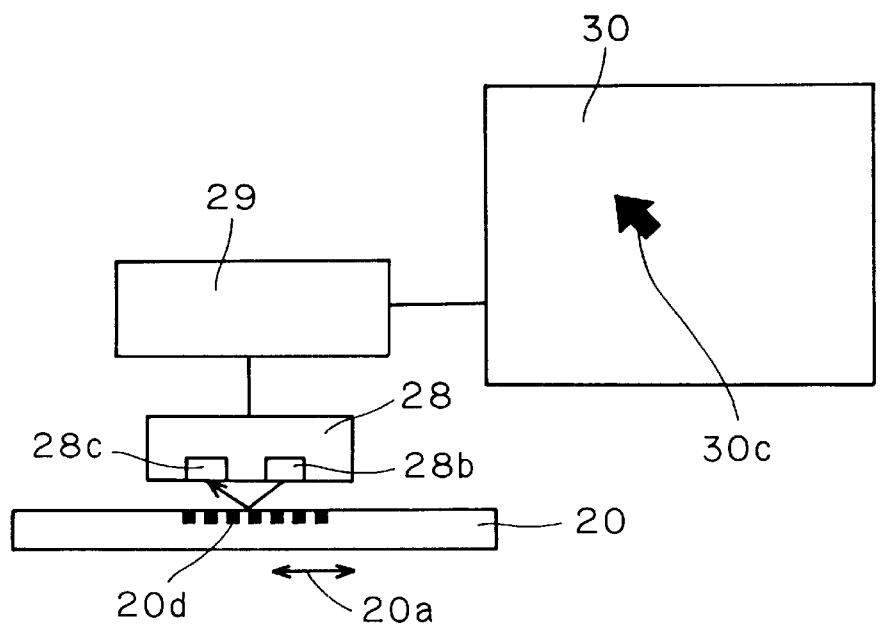
FIG. 6 provides a diagrammatic illustration of a photoelectric detecting means.

Referring in more detail to the photoelectric detecting means, reference should be made to FIG. 6. A slider 20 disposed in opposed relationship to a detecting means 28 is moved in directions as indicated by an arrow 20a. The detecting means 28 includes a light source 28b and a photoresponsive apparatus 28c. A beam of light directed by the light source 28b to the surface of the slider 20 is reflected thereon and incident on the photoresponsive apparatus 28c. During the movement of the slider 20, the quantity of light reflected on the surface thereof decreases every time the beam of light directed by the light source 28b to the surface of the slider 20 strikes a stripe d drawn thereon perpendicularly to the arrow 20a. Thus the stripe d is recognized from a decrease in the quantity of reflected light. A measurement value representing the distance by which the slider 20 is moved is obtained from the number of stripes 20d thus recognized. The movement of a cursor 30c on a display screen 30 is controlled by a controller 29 such that the cursor 30c is moved by a distance corresponding to the aforesaid measurement value and in a direction corresponding to the direction in which the slider 20 is moved.

Figure 5:
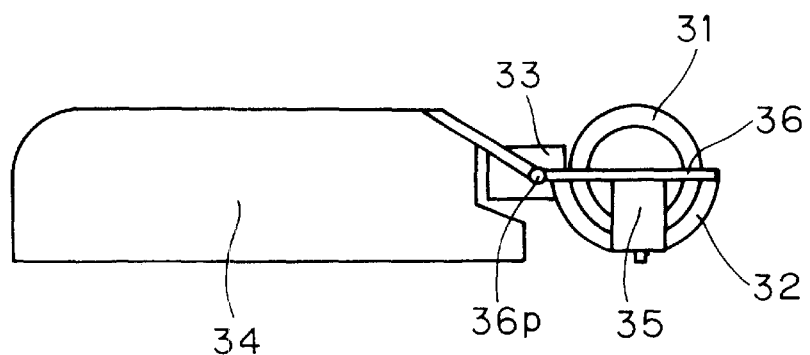
FIG. 5 is a side view thereof.

Referring now particularly to FIGS. 4 and 5, there is shown another embodiment of the invention. A roller 31 is rotatably and axially slidably received in a recessed fitting 32, with hinges 36 disposed one at each end thereof. Each of the hinges 36 comprises a fixed end connected with a palmrest 34 and a hinged end connected with an end of the recessed fitting 32. The hinged end, together with the recessed fitting 32, is pivotal about a hinge pin 36p. A switch means 35 is located below the hinged end so that switching action may be effected when the thumb or fingers of an operator engage the roller 31 or the recessed fitting 32 with a force thereto.

The outer cylindrical surface of the roller 31 has a grid drawn thereon, which serves both for detecting the direction in which the roller 31 is rotated and the number of revolutions thereof and for detecting the direction in, and the distance by, which the roller 31 is axially moved. Such detection is carried out by a detector 33 disposed approximately medially of the ends of the recessed fitting 32 and in opposed relationship to the outer cylindrical surface of the roller 31. The detector 33 is of the type well known to those skilled in the art as a detector utilized in connection with an optical mouse, which requires a special mousepad that has a grid drawn thereon. A combination of two one-dimensional position detectors of a magnetic type may also be regarded as suitable for replacing the detector 33. Signals generated by the detector 33 and the switch means 35 are provided to the computer through a control circuit (not shown).

Figure 7:
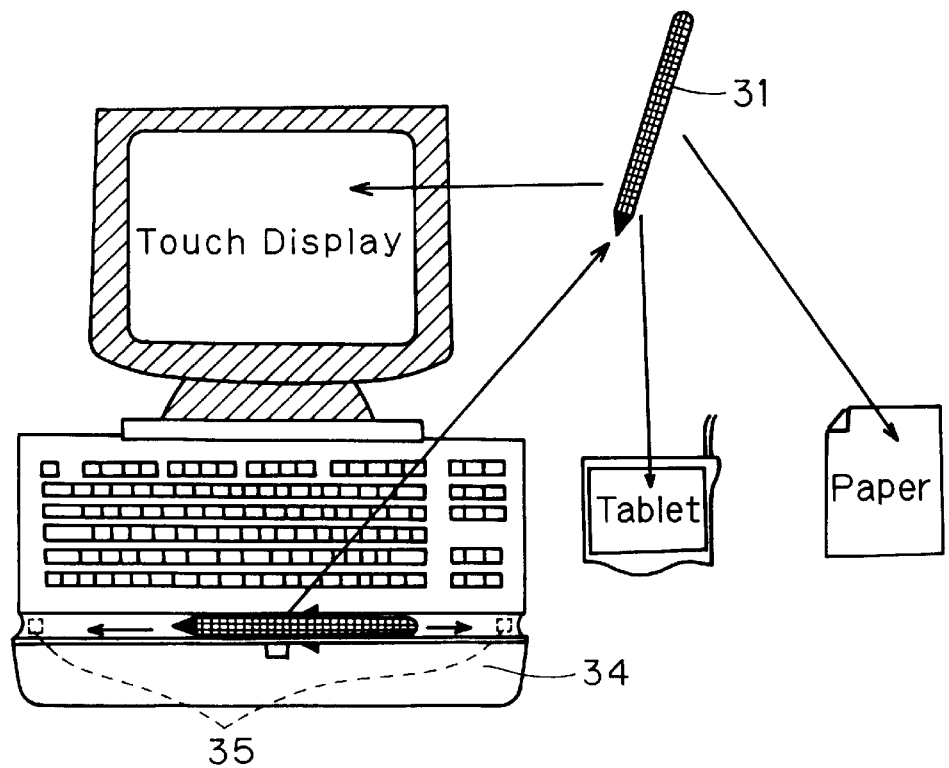
FIG. 7 is a view to help explain how a roller, when detached from a recessed fitting provided for receiving the same, can be used as a stylus for input or as a means for writing down.
Figure 8:
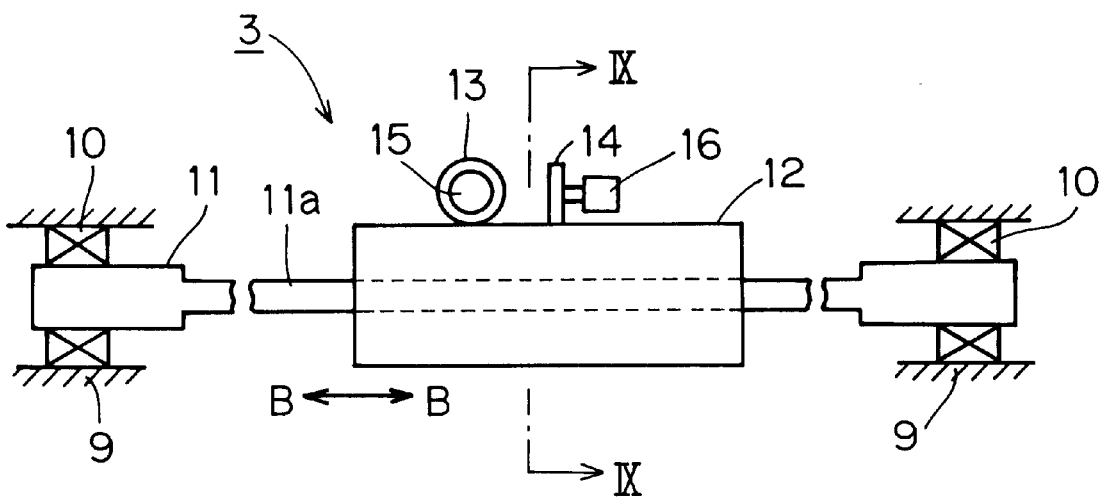
FIG. 8 is a view, in longitudinal section, of an input device in accordance with the prior art.
Figure 9:
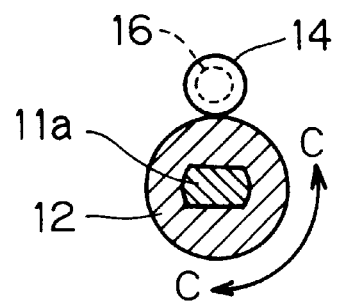
FIG. 9 is a sectional view taken on the line IX—IX of FIG. 8.

FIG. 7 is a view to help explain how the roller 31, when detached from the recessed fitting 32, can be used as a stylus for input to the computer or as a means for writing down.

In the embodiments described, the pointing device has taken the form of a device separated from the keyboard. It will be apparent, however, that the pointing device can be mounted on an extended portion of the casing of the keyboard as shown in FIG. 7. In this case, pointing action can be started quickly in liaison with the action of entering appropriate keyboard commands. Alternatively, an elongated recess for receiving the roller 31 in place of the recessed fitting 32 may be provided, e.g., in a space left between the top row of keys (e.g. function keys) and the second row from the top on the keyboard.

Particular advantages obtained from the foregoing embodiments of the invention reside in the facts that the rolling/sliding type pointing device of the invention does not require much space to use it, eliminates difficulties encountered in case of the trackball in rectilinearly moving the cursor, substantially facilitates the control over the movement of the cursor with a thumb and/or fingers, affords a wide dynamic range, and may be either incorporated in or separated from the keyboard.

What is claimed is:

1. A rolling and sliding pointing device comprising:
   a first rail with two ends, each end being joined to a palmrest;
   a pipe roller rotatably, axially, slidably, and loosely carried on the first rail; and
   non-contact photoelectric means for detecting the direction in, and the distance by, which the pipe roller is axially moved and for detecting the direction in which the pipe roller is rotated and the number of revolutions thereof, the photoelectric means being disposed on an auxiliary rail extending parallel to the first rail and in opposed relationship to an outer cylindrical surface of the pipe roller.

2. A rolling and sliding pointing device as defined in claim 1, further including a slider of U-shaped construction terminating in a pair of ends which hold said pipe roller therebetween, said ends being respectively disposed in opposed relationship to respective end faces of said pipe roller so that said slider does not rotate together with said pipe roller but is capable of axially moving together therewith.

3. A rolling and sliding pointing device as defined in claim 2, wherein said outer cylindrical surface of said pipe roller is striped along generatrices, and said slider includes a web striped perpendicularly to said first rail.

4. A rolling and sliding pointing device as defined in claims 1, 2 or 3, wherein an extension extends from each end of, and perpendicularly to, said first rail and is pivotally joined to said palmrest, switch means being disposed one at each end of said first rail on an underside thereof so that a click signal is transmitted to a computer when the thumb or fingers of an operator engage said pipe roller or said first rail with a force thereto.

5. A rolling and sliding pointing device as defined in claim 1, wherein said first rail is yieldingly maintained in floating position by springs, switch means being disposed one at each end of said first rail on an underside thereof so that a click signal is transmitted to a computer when the thumb or fingers of an operator engage said pipe roller or said first rail with a force thereto.

6. A rolling and sliding pointing device comprising:
   a recessed fitting connected with a casing;
   a roller rotatably, axially, slidably and detachably received in the recessed fitting;
   and
   non-contact photoelectric means for detecting the direction in, and the distance by, which the roller is axially moved and for detecting the direction in which the roller is rotated and the number of revolutions thereof, the photoelectric means being disposed on a side rail extended upwards from the recessed fitting and in opposed relationship to an outer cylindrical surface of the roller.

7. A rolling and sliding pointing device as defined in claim 6, wherein said roller has a grid drawn on the outer cylindrical surface.

8. A rolling and sliding pointing device as defined in claim 6, or 7, wherein an extension extends from each end of, and perpendicularly to, said recessed fitting and is pivotally joined to said casing, switch means being disposed one at each end of said recessed fitting on an underside thereof so that a click signal is transmitted to a computer when the thumb or fingers of an operator engage said roller or said recessed fitting with a force thereto.

9. A rolling and sliding pointing device as defined in claims 6 or 7, wherein said recessed fitting is yieldingly maintained in floating position by springs, switch means being disposed one at each end of said recessed fitting on an underside thereof so that a click signal is transmitted to a computer when the thumb or fingers of an operator engage said roller or said recessed fitting with a force thereto.

10. A rolling and sliding pointing device as defined in claim 6, wherein said roller, when detached from said recessed fitting, is usable as a stylus for input to a computer.

11. A rolling and sliding pointing device as defined in claim 6, wherein said casing is a palmrest.

12. A rolling and sliding pointing device as defined in claim 6, wherein said roller operates as a means for writing when detached from said recessed fitting.

13. A rolling and sliding pointing device as defined in claim 12, wherein said roller comprises a pen edge, and is operable as a stylus for input to a computer when detached from said recessed fitting.

14. A rolling and sliding pointing device as defined in claim 6, wherein said recessed fitting is mounted to an extended portion of a keyboard casing.

15. A rolling and sliding pointing device as defined in claim 14, wherein said roller comprises a pen edge, and operates as a stylus for input to a computer when detached from said recessed fitting.

16. A rolling and sliding pointing device as defined in claim 14, wherein said roller comprises a pen edge, and operates as a means for writing when detached from said recessed fitting.

17. A rolling and sliding pointing device comprising:
   a rail connected with a casing;
   a roller rotatably and axially slidably carried on the rail, the roller including a grid drawn thereon; and
   a non-contact means for detecting the direction in, and the distance by, which the roller is axially moved and for detecting the direction in which the roller is rotated and the number of revolutions thereof, wherein the non-contact means comprises a single photoelectric detector that detects the direction in which the roller is rotated and the number of revolutions thereof and detects the distance by which the roller is axially moved.

18. A rolling and sliding pointing device as defined in claim 17, wherein said non-contact means is disposed on said casing in a sliding field of said roller in opposed relationship to said roller.

19. A rolling and sliding pointing device as defined in claim 17, wherein said non-contact means is disposed on said rail in the sliding field of said roller in opposed relationship to said roller.

* * * * *